Figure 1:
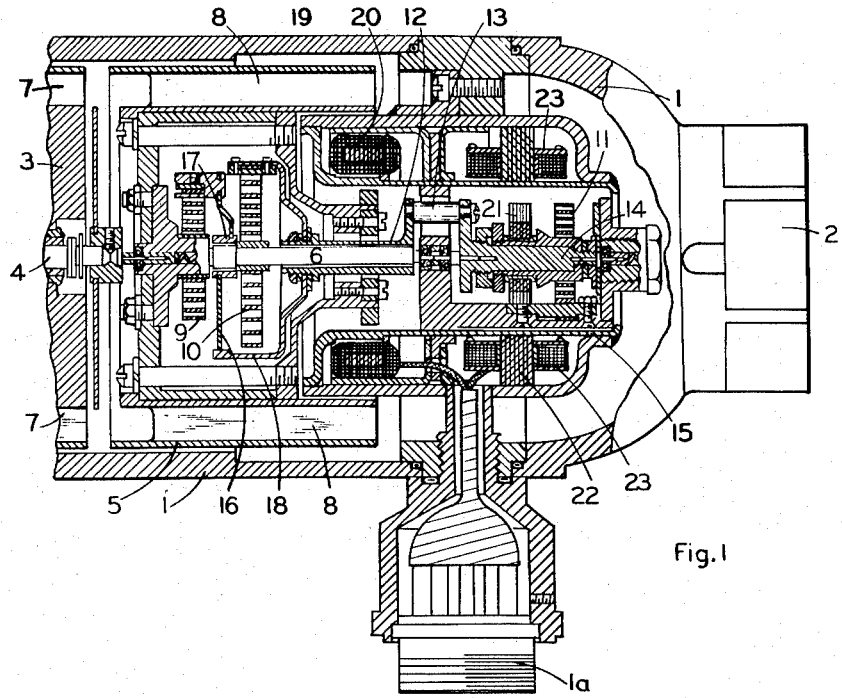

Nov. 22, 1955    H. E. TREKELL    2,724,270
FLOWMETER
Filed April 28, 1954

Inventor:
Harold E. Trekell
by Richard E. Hooley
His Attorney

United States Patent Office 2,724,270
Patented Nov. 22, 1955

2,724,270

FLOWMETER

Harold E. Trekell, Wakefield, Mass., assignor to General Electric Company, a corporation of New York Application April 28, 1954, Serial No. 426,185

9 Claims. (Cl. 73—195)

The present invention relates to summation apparatus and, more particularly, to improved spring-restrained indicators having plural angular deflection characteristics as well as summation characteristics which combine directly to yield totalized indications.

Improved readability of data presented by indicating instruments is often required over certain critical ranges of indication, and, in this connection, it has been known to provide instrument pointers which are restrained by at least two different spiral springs acting uniquely over different ranges of pointer deflections such that the instrument scale may possess expanded indicia which facilitate accurate readings within a critical range of pointer deflections. However, when several of such instruments are provided with electrical telemetering equipment which transmits their angular deflection data to a common remote position, the plural deflection characteristics of the individual instruments precludes a simple and accurate summation of the data from all of the instruments, unless complex corrective apparatus is employed to compensate for the differences in deflection characteristics. In accordance with the teachings of the instant invention, summation of indications of the aforementioned type is enabled without such corrective equipment, while leaving undisturbed the presentations of separate indications having plural characteristics.

It is therefore one object of this invention to provide a simple and improved arrangement for the summation of angular deflections of a plurality of instruments each having different angular deflection characteristics over portions of its deflection range.

Further, it is an object to provide improved spring restraint arrangements which facilitate totalizing of instrument indications.

Additionally, it is an object to provide instruments having dual deflection characteristics as well as deflection characteristics which may be added without complex corrections.

By way of a summary account of one aspect of this invention, three spiral springs are utilized for angular restraint of the angularly-movable turbine element of a mass rate flowmeter such as that disclosed in the copending application of F. B. Jennings, Serial No. 260,204, filed December 6, 1951, for "Mass Rate Flowmeter," assigned to the same assignee as that of the present application. A first one of these springs is coupled with the turbine shaft at one end and with a second independent shaft collinear with the turbine shaft at its other end. The second spiral spring angularly restrains the second shaft with reference to the outer fixed casing of the flowmeter, such that the first and second springs are serially coupled in restraint of the turbine. A third spring is permanently coupled with the turbine shaft at one end and is coupled with the second shaft only when a predetermined angular deflection of the turbine shaft is exceeded. By virtue of this construction, the turbine shaft has dual torque vs. deflection characteristics occasioned by all three springs, while the second and independent shaft possesses a separate single torque vs. deflection characteristic occasioned by the second spring alone. An electrical pick-off linearly responsive to deflections of the second shaft produces output signals which may be added to those of other like units, directly, to provide a totalized indication, and pointers or remote telemetering apparatus responsive to turbine shaft deflections each indicate the dual ranges of turbine deflections directly and without interference from the second spring and pick-off.

Figure 2:
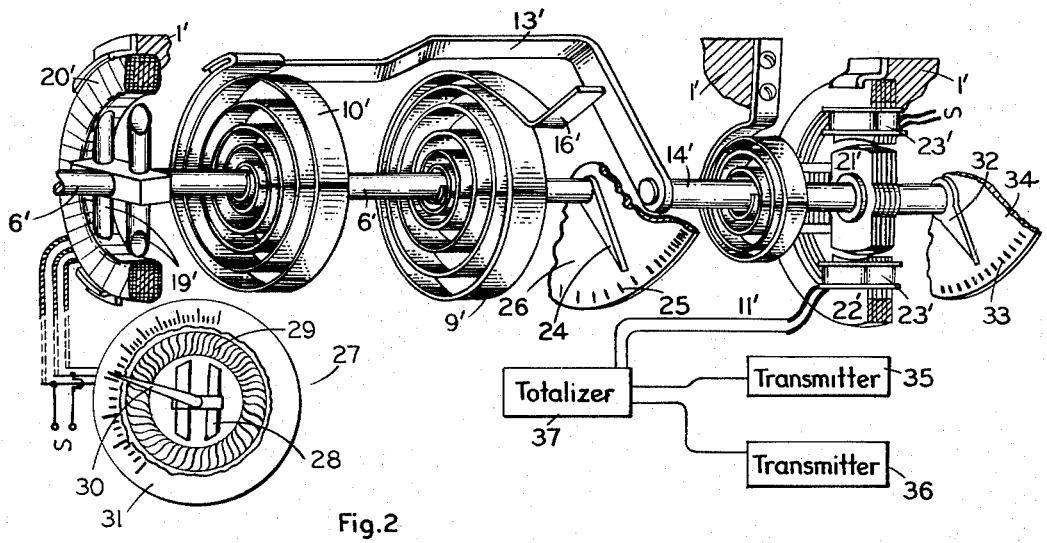

Although the features of this invention which are believed to be novel are set forth in the appended claims, greater detail of the preferred embodiments as well as the further objects and features of the invention may be readily comprehended through reference to the following description taken in connection with the accompanying drawing, wherein:

Figure 1 is a cross-sectional view of part of a mass rate flowmeter transmitter instrument embodying teachings of this invention; and Figure 2 represents a pictorial and schematic display of a preferred summation system.

Apparatus wherein this invention is particularly advantageous includes mass rate flowmeter transmitters such as those of the aforementioned Jennings application, a portion of one instrument of that type being depicted in Figure 1. A generally cylindrical fluid-tight casing 1 conducts fluid from left to right from an inlet port to an outlet port 2 where the fluid is discharged into a suitable conduit. Within casing 1 are a collinear upstream cylindrical impeller 3, rotated about its shaft 4 at a uniform angular velocity, and a downstream cylindrical turbine 5 which is spring-restrained in angular movement about the axis of its affixed support shaft 6. Both impeller 3 and turbine 5 are provided with longitudinal peripheral slots through which the fluid flow is conducted, the partitions between these narrow slots being identified by reference characters 7 and 8, respectively. As fluid flows through the transmitter casing it is first given a uniform angular velocity of motion by the constant speed impeller 3 and is subsequently reduced to zero angular velocity as it strikes and flows through the restrained turbine 5. Because the angular momentum imparted to the fluid by the impeller is wholly absorbed by the turbine, the latter deflects angularly in proportion to the mass of fluid flow per unit of time. Where a single characteristic or proportion of mass rate of flow to turbine angular deflection is adequate for indicating purposes, it is merely necessary to restrain turbine 5 by a single spiral spring connected between the turbine shaft 6 and some part fixed with casing 1. However, where more than one angular deflection characteristic is sought, as where a partly expanded and partly contracted indicating scale is desirable, the use of more than one restraining spring may be necessitated.

Three spiral springs, 9, 10, and 11, are illustrated in the illustrated flowmeter transmitter, to realize dual deflection characteristics of the turbine and to afford a signal which may be employed for totalization. Springs 10 and 11 are at all times coupled in series between the turbine shaft 6 and the casing 1. This results because the inner end of spring 10 is connected to shaft 6 while its outer end is connected to the sleeve 12 which is coupled with the inner end of spring 11 through crank arm 13 and the angularly movable shaft 14. The outer end of spring 11 is connected to the bracket 15 which is fixed to casing 1, thus completing the serial coupling of springs 10 and 11 between the turbine and casing. Spring 9 is connected with turbine shaft 6 at its inner end, but its outer end is connected with and actuates a stop arm 16 mounted on a rotatable bushing 17. Stop arm 16 is positioned to engage a stop arm 18 fixed with sleeve 12 when the turbine shaft turns beyond a certain angle at which springs 10 and 11 are sufficiently compressed to permit such engagement of the two stop arms. Thereafter, as the turbine shaft is deflected further in the same direction, the parallel combination of springs 9 and 10 is connected in series with spring 11 between the turbine and casing. The foregoing arrangement yields a turbine-casing torque vs. angular deflection characteristic which has two slopes, and the deflections for fixed increments of torque are greater before stop arms 16 and 18 become engaged. Throughout the total range of turbine deflection, however, the torque vs. angular deflection characteristic of shaft 14 is of substantially a single slope, which characteristic is established by spring 11. The dual-slope characteristic may be remotely telemetered by the second harmonic type transmitter comprised of a permanent magnet rotor 19, affixed to the turbine, and the annular stator core and winding unit 20 attached to the casing bracket 15. Similarly, the single-slope characteristic of spring 11 may be converted into electrical signals, for summation purposes, by an electrical pick-off comprised of a magnetic rotor 21 affixed to shaft 14 and a stator unit having the laminated core 22 and excitation and output windings 23. Electrical connector 1a couples the various excitation and output leads of the telemetering and pick-off units with suitable associated apparatus such as that described hereinafter.

In Figure 2 a simplified view of restraining mechanism such as that of Figure 1 is presented, together with appropriate telemetering and totalizing equipment. Inasmuch as the springs, shafts and certain other elements in this illustration correspond in function to like elements already described in connection with the apparatus of Figure 1, the identifying reference numerals are, for convenience, made the same, except that they are accompanied by prime accents in Figure 2. Angularly deflecting shaft 6' may be actuated by a flowmeter turbine or other suitable components of an instrument or other apparatus, and the collinear independent summation shaft 14' is also supported with shaft 6' for angular movement in relation to some relatively fixed support 1'. Springs 10' and 11' are serially coupled between shaft 6' and support 1', with shaft 14' and crank arm 13' intermediate these two springs, and spring 9' has a stop element 16' fixed with its outer end such that it will contact crank arm 13' when a predetermined angular displacement of shaft 6' is exceeded. Pointer 24 attached to shaft 6' may be read against the indicia 25 on a dial 26, the indicia being expanded over a lower scale portion, as contrasted with the more contracted indicia appearing across the upper scale portion which is read when both springs 9' and 10' are effective in restraining shaft 6'. Electrical telemetering of deflections of shaft 6' to a receiver unit 27 having rotor and stator portions 28 and 29 corresponding to the transmitter rotor and stator 19' and 20', respectively, will occasion movements of a receiver pointer 30 across a dial 31 in the same manner as described for pointer 24 and dial 26.

Pointer 32 attached to the intermediate summation shaft 14' may be read against uniformly-distributed indicia 33 on a dial 34. However, the principal value of the uniform-deflection characteristic of shaft 14' is realized when an electrical pick-off such as that comprised of rotor 21' and stator elements 22' and 23' is employed to translate angular deflections into electrical output signals. The pick-off used should produce output signals varying linearly in relation to angular movements of shaft 14, and the spring 11' should have a linear torque vs. deflection characteristic also. When these simple and easily-realized requirements are met, the pick-off signals of several such arrangements may be added directly to yield a totalized indication which is accurate. Transmitters 35 and 36 represent similar units which also possess summation springs and linear pick-offs in addition to springs having multiple deflection characteristics for direct-indicating purposes. While dual deflection characteristics have been discussed, it is obvious that the various transmitters the outputs of which are being totalized may have different types or numbers of deflection characteristics for direct-indicating purposes without effect upon the accuracy of the totalized data. Pick-offs having linear deflection vs. output characteristics are well known, and a suitable totalizer, 37, for the pick-off output signals may comprise any conventional arrangements for merely adding electrical signals and affording an appropriate presentation of their sum.

It should be apparent that the specific embodiments of the invention disclosed herein are of a descriptive rather than a limiting nature and that various changes, substitutions and modifications may be employed in accordance with these teachings without departing in spirit or scope from the invention in its broadest aspects.

What I claim as new and desire to secure by Letters Patent of the United States is:

1. Apparatus responsive to angular motion, comprising a first angularly movable shaft, a relatively fixed support, means supporting said shaft for angular movement in relation to said fixed support, a second shaft, means supporting said second shaft for angular movement in relation to said fixed support, first resilient means coupled between said first and second shafts and angularly restraining said first shaft in relation to said second shaft, said resilient means having at least two different torque versus angular deflection characteristics each of which is effective in angular restraint of said first shaft over a different range of angular deflection of said first shaft, and second resilient means coupled between said second shaft and said support and angularly restraining angular movement of said second shaft in relation to said fixed support, said second resilient means having a substantially linear torque versus angular deflection characteristic.

2. Apparatus responsive to angular motion, comprising a first angularly movable shaft, a relatively fixed support, means supporting said shaft for angular movement in relation to said fixed support, a second shaft, means supporting said second shaft for angular movement in relation to said fixed support, first resilient means coupled between said first and second shafts and angularly restraining said first shaft in relation to said second shaft, said resilient means having at least two different torque versus angular deflection characteristics each of which is effective in angular restraint between said first and second shafts over a different range of angular deflection between said first and second shafts, indicating means responsive to angular deflections of said first shaft in relation to said fixed support, second resilient means coupled between said second shaft and said support and restraining angular movement of said second shaft in relation to said fixed support, said second resilient means having a substantially linear torque versus angular deflection characteristic, and electrical pick-off means coupled between said second shaft and said support and characterizing angular relationships between said second shaft and said fixed support in electrical output signals.

3. Apparatus responsive to angular motion, comprising a first angularly movable shaft, a relatively fixed support, means supporting said shaft for angular movement in relation to said fixed support, a second shaft, means supporting said second shaft for angular movement in relation to said fixed support, a first spiral spring having one end coupled with said first shaft and another end coupled with said second shaft, a second spiral spring having one end coupled with said first shaft, means coupling another end of said second spring with said second shaft when said first shaft is angularly deflected beyond a predetermined position and decoupling said other end of said second spring from said second shaft when said first shaft is angularly positioned below said predetermined position, and a third spiral spring having one end coupled with said second shaft and another end coupled with said fixed support.

4. Apparatus responsive to angular movement, comprising a first angularly movable shaft, a relatively fixed support, means supporting said shaft for angular movement in relation to said fixed support, a second shaft, means supporting asid second shaft for angular movement in relation to said fixed support, spiral spring means coupled between said second shaft and said support and restraining angular movement of said second shaft in relation to said fixed support, and resilient restraining means having at least a two-slope torque versus angular deflection characteristic coupled between said first and second shafts and angularly restraining said first shaft in relation to said second shaft.

5. Apparatus responsive to angular movement, comprising a first angularly movable shaft, a relatively fixed support, means supporting said shaft for angular movement in relation to said fixed support, a second shaft, means supporting said second shaft for angular movement in relation to said fixed support, means having a substantially linear torque versus angular deflection characteristic coupled between said second shaft and said support in restraint of angular movement of said second shaft in relation to said fixed support, and means having a torque versus angular deflection characteristic with at least two different linear slopes over different angular deflection ranges coupled between said first and second shafts in restraint of angular movement of said first shaft in relation to said second shaft.

6. Apparatus responsive to angular movement, comprising a first angularly movable shaft, a relatively fixed support, means supporting said shaft for angular movement in relation to said fixed support, a second angularly movable shaft, means supporting said second shaft for angular movement in relation to said fixed support, a first spiral spring having one end angularly fixed with said first shaft and another end angularly fixed with said second shaft, a second spiral spring having one end angularly fixed with said first shaft and another end disposed to impose torque upon said second shaft in one angular direction when said first shaft exceeds a predetermined angular deflection in said direction, means measuring angular deflections of said first shaft in relation to said fixed support, a third spiral spring having one end fixed with said second shaft and another end fixed with said fixed support, and electrical pick-off means coupled between said second shaft and said support and producing electrical signals having a characteristic varying linearly with angular deflections of said second shaft in relation to said fixed support.

7. Apparatus responsive to angular movements, comprising at least two instruments; each of said instruments including a first angularly moveable shaft, a relatively fixed support, means supporting said shaft for angular movement in relation to said support, a second angularly movable shaft, means supporting said second shaft for angular movement in relation to said support, means having a linear torque versus angular deflection characteristic coupled between said second shaft and said support in restrain of angular movement of said second shaft in relation to said fixed support, means having a torque versus angular deflection characteristic with at least two different linear slopes over different angular deflection ranges coupled between said first and second shafts in restraint of angular movement of said first shaft in relation to said second shaft, means measuring angular relationships between said first shaft and said fixed support, and electrical pick-off means coupled between said second shaft and said support and producing electrical signals having a characteristic varying linearly with angular deflections of said second shaft in relation to said fixed support; and means adding said signals from said pick-off means of all of said instruments and providing indications responsive to the sums of said signals.

8. Apparatus responsive to angular movements, comprising a plurality of instruments; each of said instruments including a first angularly movable shaft, a relatively fixed support, means supporting said shaft for angular movement in relation to said support, means impressing torques upon said first shaft in response to a characteristic to be measured, a second angularly movable shaft, means supporting said second shaft for angular movement in relation to said support, first resilient means coupled between said first and second shafts and angularly restraining said first shaft in relation to said second shaft, said resilient means having at least two different torque versus angular deflection characteristics each of which is effective in angular restraint between said first and second shafts over a differentr ange of angular deflections between said shafts, indicating means responsive to angular deflections of said first shaft in relation to said fixed support, second resilient means coupled between said second shaft and said support and restraining angular movement of said second shaft in relation to said fixed support, said second resilient means having a substantially linear torque versus angular deflection characteristic, and electrical pick-off means coupled between said second shaft and said support and producing electrical signals having a characteristic varying linearly with angular deflections of said second shaft in relation to said fixed support; and means adding said electrical signals from said pick-off means of all of said instruments and providing indications responsive to the sums of said signals.

9. Apparatus responsive to angular movements, comprising a plurality of flowmeters each having a turbine angularly movable in response to mass rate of fluid flow; each of said flowmeters including an angularly movable turbine shaft angularly responsive to said mass rate of fluid flow, a fixed flowmeter casing, means supporting said turbine shaft for angular movement relative to said casing, a second angularly movable shaft supported in said casing, a first spiral spring coupled at one end with said turbine shaft and at another end with said second shaft, a second spiral spring having one end coupled with said turbine shaft and another end arranged for coupling with said second shaft when said turbine shaft exceeds a predetermined angular deflection in a given angular direction from a reference position, electrical means telemetering angular deflections of said turbine shaft in relation to said casing to a remote position, a third spiral spring having one end coupled with said second shaft and another end coupled with said casing, and electrical pick-off means producing electrical signals having amplitudes varying linearly with angular deflections of said second shaft in relation to said casing; and means adding said electrical signals from said pick-offs of said plurality of flowmeters and providing indications of the sums of the mass rate of flow of said flowmeters.

References Cited in the file of this patent

UNITED STATES PATENTS

| | | |
|---|---|---|
| 1,665,141 | Mayer | Apr. 3, 1928 |
| 2,057,576 | Johnson | Oct. 13, 1936 |
| 2,619,933 | Gordon, Jr., et al. | Dec. 2, 1952 |